United States Patent [19]

Chatelin et al.

[11] Patent Number: 4,627,920

[45] Date of Patent: Dec. 9, 1986

[54] PROCESS FOR THE RETENTION OF A SUBSTANCE DISSOLVED IN A SOLUTION

[75] Inventors: Roger Chatelin, Lozanne; Jean-François Combes, Servian; Daniel Wattiez, Lozanne, all of France

[73] Assignee: Institut Textile de France, Boulogne Billancourt, France

[21] Appl. No.: 631,680

[22] Filed: Jul. 17, 1984

[30] Foreign Application Priority Data

Jul. 22, 1983 [FR] France ............................ 83 12187

[51] Int. Cl.$^4$ ............................................. B01D 15/04
[52] U.S. Cl. .................................... 210/668; 210/669; 210/684
[58] Field of Search ............... 210/668, 669, 681, 684, 210/688, 727, 666, 683, 686

[56] References Cited

U.S. PATENT DOCUMENTS

| | | | |
|---|---|---|---|
| 3,984,314 | 10/1976 | Fries | 210/684 |
| 4,076,618 | 2/1978 | Zeblisky | 210/688 |
| 4,167,481 | 9/1979 | Cremers et al. | 210/688 |
| 4,425,238 | 1/1984 | Degen et al. | 210/666 |

Primary Examiner—Ivars Cintins
Attorney, Agent, or Firm—Millen & White

[57] ABSTRACT

The process consists firstly in adding, to the solution, an excess of a polyelectrolyte capable of forming an ionic association with the dissolved substance which it is desired to retain, and then in bringing the solution thus obtained into contact with a material possessing ionic groups which retain the polyelectrolyte by virtue of its ionic groups not associated with the said substance. The solution and the material can be brought into contact either by filtration or by tangential bathing. The polyelectrolyte can be retained either by ion exchange or by a charge repulsion effect.

The material is advantageously a fibrous material of which the ionic groups are obtained by grafting.

18 Claims, No Drawings

PROCESS FOR THE RETENTION OF A SUBSTANCE DISSOLVED IN A SOLUTION

BACKGROUND OF THE INVENTION

This invention relates to a process for the retention of at least one substance dissolved in a solution; in particular, the process can involve the purification of industrial effluents by retaining toxic soluble substances, or the extraction of the precious metals from these effluents.

Numerous processes are known for the treatment of solutions in order to retain substances which they contain in the dissolved state. Some of these processes are based on the size of the substances in question these are, in particular, the techniques of ultrafiltration and reverse osmosis - and others are based on ion exchange. For example, Certificates of Addition Nos. 72/20,919 and 72/25,472 describe anion and cation exchange celluloses and their application to the treatment of certain types of industrial waste water: the substances dissolved in this waste water, and hence in the ionic state, are retained on the cellulose material by virtue of the ion exchange capacity which cellulose possesses.

The invention falls into the category which involves ion exchange, but its object is to overcome the disadvantages commonly encountered, namely clogging and limited capacity: clogging takes place because, unless the solutions treated are free of insoluble matter, the materials used clog up very rapidly, and limited capacity results in the escape of ions as soon as the ion exhange capacity is saturated by the substances dissolved in the solution.

SUMMARY OF THE INVENTION

According to the invention, in the process for the retention of at least one substance dissolved in a solution, in a first step, an excess of a polyelectrolyte capable of forming an ionic association with the said substance is added to the solution, and in a second step, the solution is brought into contact with a material possessing ionic groups which retain the polyelectrolyte contained in the solution by virtue of the ionic groups not associated with the said substance. Thus, the material containing ionic groups used in the second step serves not to retain directly the substance dissolved in the solution, as is the case in the traditional ion exchange techniques, but rather to retain the polyelectrolyte associated with the dissolved substance. When the first step is carried out, the addition of excess of polyelectrolyte is essential so that the entity formed by the association of the polyelectrolyte with the substance to be retained still possesses ionic groups capable of being retained by the material. Furthermore, the choice of polyelectrolyte depends on the dissolved substance which it is desired to retain and on its ability to associate ionically with the said substance; thus, with an appropriate choice of polyelectrolyte, the process according to the invention can specifically retain given substances even if their concentration in the solution is very low relative to other dissolved substances which it is not desired to retain, or even if they have a lower affinity compared with the material employed by itself. There are two possible methods of retaining the polyelectrolyte in the second step. In the first case, the ionic groups of the retention material have the opposite sign to that of the ionic groups of the polyelectrolyte, whereby the entities formed by the association of the polyelectrolyte with the dissolved substance are retained by the material by means of ion exchange in respect of the ionic groups of the polyelectrolyte which are not associated with the dissolved substance. In the second case, the ionic groups of the retention material have the same sign as that of the ionic groups of the polyelectrolyte, whereby the entities formed by the association of the polyelectrolyte with the dissolved substance are stopped by the material by means of a charge repulsion effect.

In the second step of the process according to the invention, the solution can be brought into contact with the material in two ways: either the solution is passed through the material like a filter, or a film of the solution is passed across the material, i.e., transverse current by bathing. In the first case, the retention efficacy in respect of the dissolved substance will also depend on the cut-off threshold of the material, i.e. on its porosity relative to the size of the entity formed by the polyelectrolyte associated with the dissolved substance. In the second case, on the other hand, the retention efficacy is much less dependent on this cut-off threshold since the contact between the polyelectrolyte associated with the dissolved substance, and the material, is much closer.

In the techniques of the ultrafiltration type, the retention of a dissolved substance is due to the purely mechanical stopping of this substance, which, by virtue of its size, is unable to pass through the ultrafiltration membrane. In this case, the retention of a substance will only be possible insofar as, on the one hand, the said substance has a relatively constant size, and, on the other hand, the membrane has a sufficient cut-off threshold to stop the substances of this size. The advantage of the invention by comparison with such a technique is the fact that the stopping of the substance is both mechanical - dependent on the size of the entity formed by the polyelectrolyte associated with the dissolved substance - and ionic by nature. Thus, even if the cut-off threshold of the material is such that the mechanical barrier effect would allow the polyelectrolytes associated with the dissolved substance to pass through, the said associated polyelectrolytes are wholly or partially retained by virtue of the ionic barrier effect. Of course, the efficacy of this ionic barrier effect is dependent on the flow rate of the solution to be treated and on the contact time between the solution and the material; this explains why it is generally preferable to use the material by the transverse current technique when the cut-off threshold is considerably greater than the size of the associated polyelectrolytes which it is desired to retain.

In the first stage of the process according to the invention, the polyelectrolyte is added in excess, on the one hand to form associations between the polyelectrolyte and the dissolved substance and on the other hand to preserve, on the polyelectrolytes associated in this way, ionic groups capable of being retained by the material used in the second stage. Nevertheless, even with an excess of polyelectrolyte relative to the quantity of dissolved substance, it can happen that some of the dissolved substance does not become associated with the polyelectrolyte and remains in the solution in its initial form. In this case, it is advantageous to use, in the second stage, not one but two materials containing ionic groups: the first material, having ionic groups of opposite sign to that of the ionic groups of the polyelectrolyte, retains these polyelectrolytes by ion exchange, and the second material, having ionic groups of the same sign as that of the ionic groups of the polyelectrolyte, retains the dissolved substance which has remained in the solution in ionic form and not associated, by a charge repulsion effect. Thus, the first material retains the greater part of the dissolved substance, which is associated with the polyelectrolyte, and the second retains the remainder of the dissolved substance, which is still in the ionic state in the solution. Compared with the use of single material, of the same type as the second material described above, for retaining all the substance dissolved in the ionic state in the solution, the combination according to the invention has the advantage of not being restricted from the point of view of the ion exchange capacity. In fact, in the case of a conventional ion exchange material, the ionic groups of the said material retain directly the substance dissolved in the ionic state and the efficacy of this retention depends on the number of accessible ionic groups available on the material, i.e. its capacity. When carrying out the process of the invention, in view of the fact that, in the first stage, the dissolved substance is associated with a polyelectrolyte, which is effectively soluble ion exchanger, and that only a reduced quantity of ionic groups is left on this polyelectrolyte, the quantity of ionic groups on the exchange material which is necessary to retain the said associated polyelectrolyte will be much smaller than in the previous case.

Once retained by the ion exchange material, the substance associated with the polyelectrolyte can be removed or recovered by a variety of processes. The material can be incinerated, especially where a toxic substance is involved. It can be regenerated, in a manner conventional in ion exchange, by the passage of a solution which is acidic or basic according to the sign of the ion exchanger. In this case, as the bonds between the polyelectrolyte and the material are relatively weak, the quantity of regenerating reagents will also be smaller. If the ionic groups of the material used in the second stage have the same sign as that of the polyelectrolyte, and hence the retention is effected by charge repulsion in addition to the mechanical barrier effect, the polyelectrolyte associated with the dissolved substance can be separated from the material by a simple mechanical operation of the type involving unclogging by rinsing, because there is no effective bond between the polyelectrolyte and the material. It is also possible to carry out exchange of the substance associated with the polyelectrolyte by leaving all or part of the said polyelectrolyte on the material.

The invention will be understood more clearly by virtue of the practical examples which are described below by way of illustration of the process according to the invention wherein the polyelectrolyte is in each case a soluble organic compound.

EXAMPLE 1

One liter of an aqueous solution contains 160 mg of copper in the form of the sulfate. 150 mg of polyacrylic acid with an average molecular weight of between 2000 and 10,000, which is a polyelectrolyte possessing negatively charged carboxyl groups as the ionic groups, are added. After slow stirring for one minute, an increase in the bluish color of the solution is observed, the solution nevertheless remaining clear: this bluish color denotes fixation of the cupric ions to the polyacrylic acid.

1.a. This solution is filtered on a disc of conventional filter paper which is not an ion exchanger, the average porosity being 5 microns, the useful diameter 50 mm and the weight 170 g/m². The filtrate collected contains 130 mg/liter of polyacrylic acid, which illustrates the weak mechanical barrier effect taking account of the size of the polyelectrolyte.

1.b. Starting with the same solution, it is filtered on a disc of grafted anion exchange paper produced in accordance with the teaching of French Certificate of Addition No. 72/20,919 and having the same physical characteristics as the filter paper used under 1.a. The filtrate collected contains 45 mg of polyacrylic acid and 55 mg of copper: a small part of the copper is not associated with the polyelectrolyte.

1.c. The same operation is carried out as under 1.b., but with 5 discs of grafted anion exchange paper placed on top of one another. The filtrate collected contains 3 mg of polyelectrolyte and 12 mg of copper: the copper in the ionic state, not associated with the polyelectrolyte, has not been retained, whereas the associated copper has been almost totally retained.

1.d. The same operation is carried out as under 1.c., but with 3 discs of grafted anion exchange paper and 2 discs of grafted cation exchange paper placed on top of one another, the latter being produced in accordance with the teaching of French Certificate of Addition No. 72/25,472. The filtrate collected contains 5 g of polyelectrolyte and less than 1 mg of copper; the discs of grafted cation exchange paper have a slightly bluish color characteristic of the presence of the cupric ions.

EXAMPLE 2

A similar operation to that described in Example 1.d. is carried out, but the starting solution contains a polyacrylic acid having an average molecular weight of between 30,000 and 50,000. The filtrate collected contains less than 1 mg of copper, but the polyelectrolyte is no longer detectable in the filtrate; it has been totally retained by the combined mechanical and ionic barrier effects.

EXAMPLE 3

A similar operation to that described in Example 1.d. is carried out, but the starting solution contains 100 mg of copper sulfate and 100 mg of nickel sulfate. The filtrate collected contains 10 mg/liter of polyacrylic acid, 2 mg/liter of copper and 2 mg/liter of nickel. The cupric and nickel ions are capable of associating with the polyacrylic acid under the same conditions.

EXAMPLE 4

The starting solution consists of 10 liters of a solution containing 50 mg/liter of potassium dichromate, treated with a soluble polyelectrolyte of the polyvinyl alcohol type containing quaternary ammonium groups, at a concentration of 1 g/liter. After stirring slowly for one minute, the solution is filtered:

4.a. on four discs of grafted cation exchange paper of diameter 20 cm and total weight 33 g. The filtrate collected contains 8 mg/liter of dichromate.

4.b. on three discs of grafted cation exchange paper and one disc of grafted anion exchange paper. The filtrate collected contains less than 1 mg/liter of dichromate.

EXAMPLE 5

A quaternized polydiethylaminoethyl methacrylate, which is a polyelectrolyte possessing a strong anion exchange capacity, is added in a proportion of 1 g/liter to a solution containing a C 16 sulfonate emulsifier of molecular weight 342 at a concentration of 1.1 g/liter.

10 liters of this solution are passed transversely, under low pressure, across one disc of grafted cation exchange paper and one disc of grafted anion exchange paper. The residual solution contains less than 10 mg/liter of emulsifier.

The examples above do not restrict the invention. In particular, the form of the material possessing ionic groups is not exclusively a paper, but can be any form appropriate to the problem to be solved: resin, woven fabric, fibers, filaments, wadding, powder etc. The paper form has the advantage of a large contact area coupled with the high hydrophobicity of the cellulose. The material dispersed in the solution in the form of powder, fibers, filaments or wadding can easily be isolated by the conventional operations such as mechanical filtration, settling, centrifugation etc. Furthermore, as seen above, it is possible to use different polyelectrolytes of various molecular weights, the groups of which are anionic or cationic; it is up to those skilled in the art to choose both the polyelectrolyte and the material according to the operating conditions and the substance or substances to be retained.

What is claimed is:

1. A process for the retention of at least one substance dissolved in a solution, wherein, in a first step, an excess of a soluble organic polyelectrolyte capable of forming an ionic association with the said substance is added to the solution to form a soluble entity wherein said polyelectrolyte contains electrolyte groups ionically associated with said substance and other electrolyte groups not ionically associated with said substance and in a second step, the solution thus obtained is brought into contact with a material possessing ionic groups which retain the polyelectrolyte by virtue of said electrolyte groups not ionically associated with the said substance.

2. The process as claimed in claim 1, wherein the second step consists in passing the solution through the material possessing ionic groups and in recovering the solution treated by filtration.

3. The process as claimed in claim 1, wherein the second step comprising passing the solution over the material possessing ionic groups and in recovering the resultant treated solution.

4. The process as claimed in claim 1, wherein the second step comprising dispersing the material possessing ionic groups in the solution in the form of powder, fibers, filaments or wadding, and in recovering the solution treated by isolating the dispersed material.

5. The process as claimed in claim 1, wherein the material is a fibrous material.

6. The process as claimed in claim 5, wherein the ionic groups of the fibrous material have been obtained by grafting.

7. A process according to claim 5 wherein the polyelectrolyte is polyacrylic acid, polyvinyl alcohol containing quaternary ammonium groups or polydiethylaminoethyl methacrylate.

8. The process as claimed in one of claims 1 to 4, 5 and 7, wherein the material contains ionic groups having the opposite sign to that of the ionic groups of the polyelectrolyte, whereby the polyelectrolyte associated with the dissolved substance is retained by the material by means of ion exchange in respect of its ionic groups which are not associated.

9. The process as claimed in one of claims 1 to 4, 5 and 7, wherein the material contains ionic groups having the same sign as that of the ionic groups of the polyelectrolyte, whereby the polyelectrolyte associated with the dissolved substance is stopped by the material by means of a charge repulsion effect in respect of its ionic groups which are not associated.

10. A process according to claim 7 wherein the material is cellulose having ionic groups grafted thereon.

11. The process as claimed in one of claims 1 to 4 and 5 and 7, wherein the material contains at least two ionic groups, one having the same sign as that of the ionic groups of the polyelectrolyte and the other having the opposite sign, whereby, on the one hand, the polyelectrolyte associated with the dissolved substance is retained by the material by means of ion exchange in respect of its ionic groups which are not associated, and on the other hand, the dissolved substance which is not associated with the polyelectrolyte is retained by the material by means of a charge repulsion effect.

12. A process as claimed in claim 1, wherein the polyelectrolyte is a polyacrylic acid having an average molecular weight of between 30,000 and 50,000.

13. A process as claimed in claim 1, wherein the resulting solution obtained after contacting the material possessing ionic groups is a clear solution which contains at least one substance dissolved.

14. A process for the retention of at least one substance dissolved in a solution, wherein, in a first step, an excess of a soluble organic polyelectrolyte capable of forming an anionic association with said substance is added to the solution to form an entity wherein said polyelectrolyte contains electrolyte groups ionically associated with said substance and other electrolyte groups not ionically associated with said substance and in a second step, the solution thus obtained is brought into contact with a material possessing ionic groups which retain the polyelectrolyte by virtue of said electrolyte groups not ionically associated with the said substance, said material being a fibrous material wherein the ionic groups of the fibrous material have been obtained by grafting.

15. The process as claimed in claim 14, wherein the material is cellulose material having ionic groups grafted thereon.

16. A process according to claim 14 or 15, wherein the polyelectrolyte is polyacrylic acid, polyvinyl alcohol containing quaternary ammonium groups or polydiethylaminoethyl methacrylate.

17. The process as claimed in claims 14 or 15, wherein the material contains ionic groups having the opposite sign to that of the ionic groups of the polyelectrolyte, whereby the polyelectrolyte associated with the dissolved substance is retained by the material by means of ion exchange in respect of its ionic groups which are not associated.

18. The process as claimed in claims 14 or 15, wherein the material contains ionic groups having the same sign as that of the ionic groups of the polyelectrolyte, whereby the polyelectrolyte associated with the dissolved substance is stopped by the material by means of a charge repulsion effect in respect of its ionic groups which are not associated.

* * * * *